United States Patent
Sejourne et al.

(10) Patent No.: US 9,981,805 B2
(45) Date of Patent: May 29, 2018

(54) ROLLER TRACK HAVING A PROFILE RAIL

(75) Inventors: Jerome Sejourne, La Bruffiere (FR);
Bertrand Reymond, Bellevulle sur Vie (FR)

(73) Assignee: INTERROLL HOLDING AG, Sant'Antonino (CH)

( * ) Notice: Subject to any disclaimer, the term of this patent is extended or adjusted under 35 U.S.C. 154(b) by 1975 days.

(21) Appl. No.: 13/003,402

(22) PCT Filed: Jul. 9, 2009

(86) PCT No.: PCT/EP2009/004990
§ 371 (c)(1),
(2), (4) Date: Mar. 2, 2012

(87) PCT Pub. No.: WO2010/003674
PCT Pub. Date: Jan. 14, 2010

(65) Prior Publication Data
US 2012/0181141 A1    Jul. 19, 2012

(30) Foreign Application Priority Data

Jul. 9, 2008  (EP) ..................................... 08290677

(51) Int. Cl.
*B65G 13/00* (2006.01)
*B65G 13/11* (2006.01)

(52) U.S. Cl.
CPC ......... *B65G 13/11* (2013.01); *Y10T 29/49826* (2015.01); *Y10T 29/53* (2015.01)

(58) Field of Classification Search
CPC ................................ B65G 13/00; B65G 13/11
(Continued)

(56) References Cited

U.S. PATENT DOCUMENTS 2,827,153 A * 3/1958 Olk ...................... B65G 13/071
193/35 R
2,964,155 A * 12/1960 Flowers ................. B65G 13/11
193/35 R
(Continued)

FOREIGN PATENT DOCUMENTS

DE         94 10 424       8/1994
EP         1 108 658       6/2001
(Continued)

OTHER PUBLICATIONS

Mechinery Mechanics: Fundamental Dictionary by Krainev A. F.
Translation of International Preliminary Report on Patentability.

*Primary Examiner* — Douglas A Hess
(74) *Attorney, Agent, or Firm* — Gerald E. Hespos; Michael J. Porco; Matthew T. Hespos

(57) ABSTRACT

A roller track for transporting stored goods has a profile rail (1) with a base (11) and two side walls (12) extending at an angle from the base (11). The side walls (12) can pivot onto each other under the influence of a force directed toward the base (11). Roller bodies (2) are supported rotatably about axles (3) in bearing openings (4) of the side walls (12). The bearing openings (4), wherein the bearing openings (4) are designed as countersinks extending from the free end of the sides walls (12) in the direction of the base (12). The roller bodies (2) are inserted into the bearing openings (4) together with the rotating axles (3) substantially in the direction of the side walls (12).

13 Claims, 5 Drawing Sheets

(58) Field of Classification Search
USPC .................................. 193/35 R, 37; 198/780
See application file for complete search history.

(56) References Cited

U.S. PATENT DOCUMENTS

| | | | |
|---|---|---|---|
| 3,420,348 A | | 1/1969 | Caudell et al. |
| 3,586,142 A | * | 6/1971 | Inwood .................. B65G 1/023 |
| | | | 193/35 R |
| 3,721,326 A | * | 3/1973 | Bussienne .............. B65G 13/11 |
| | | | 193/35 R |
| 4,054,195 A | * | 10/1977 | Wahl ...................... B65G 13/11 |
| | | | 193/35 R |
| 4,239,100 A | * | 12/1980 | Corey .................... B65G 13/11 |
| | | | 193/35 R |
| 4,681,203 A | * | 7/1987 | Kornylak ............... B65G 13/11 |
| | | | 193/35 R |
| 4,969,548 A | * | 11/1990 | Kornylak ............... B65G 39/06 |
| | | | 193/35 R |
| 5,056,642 A | * | 10/1991 | Highsmith ............. B65G 1/023 |
| | | | 193/35 R |
| 5,392,627 A | | 2/1995 | Benz |
| 5,476,167 A | * | 12/1995 | Highsmith ............. B65G 1/023 |
| | | | 193/35 R |
| 6,105,746 A | * | 8/2000 | Faisant ................... B65G 39/12 |
| | | | 193/35 R |
| 6,230,908 B1 | * | 5/2001 | Sloan ..................... B65G 1/023 |
| | | | 193/35 A |
| 6,523,664 B2 | * | 2/2003 | Shaw ..................... B65G 1/023 |
| | | | 193/35 R |
| 7,147,096 B2 | | 12/2006 | Mueller |
| 7,204,358 B2 | | 4/2007 | Mueller |
| 9,233,796 B2 | * | 1/2016 | Augustsson ........... B65G 13/11 |

FOREIGN PATENT DOCUMENTS

| | | |
|---|---|---|
| EP | 1 652 794 | 5/2006 |
| JP | 5-238527 | 9/1993 |
| JP | 2003-20106 | 1/2003 |
| KR | 2002-15858 | 3/2001 |
| SU | 1285290 | 1/1987 |

* cited by examiner

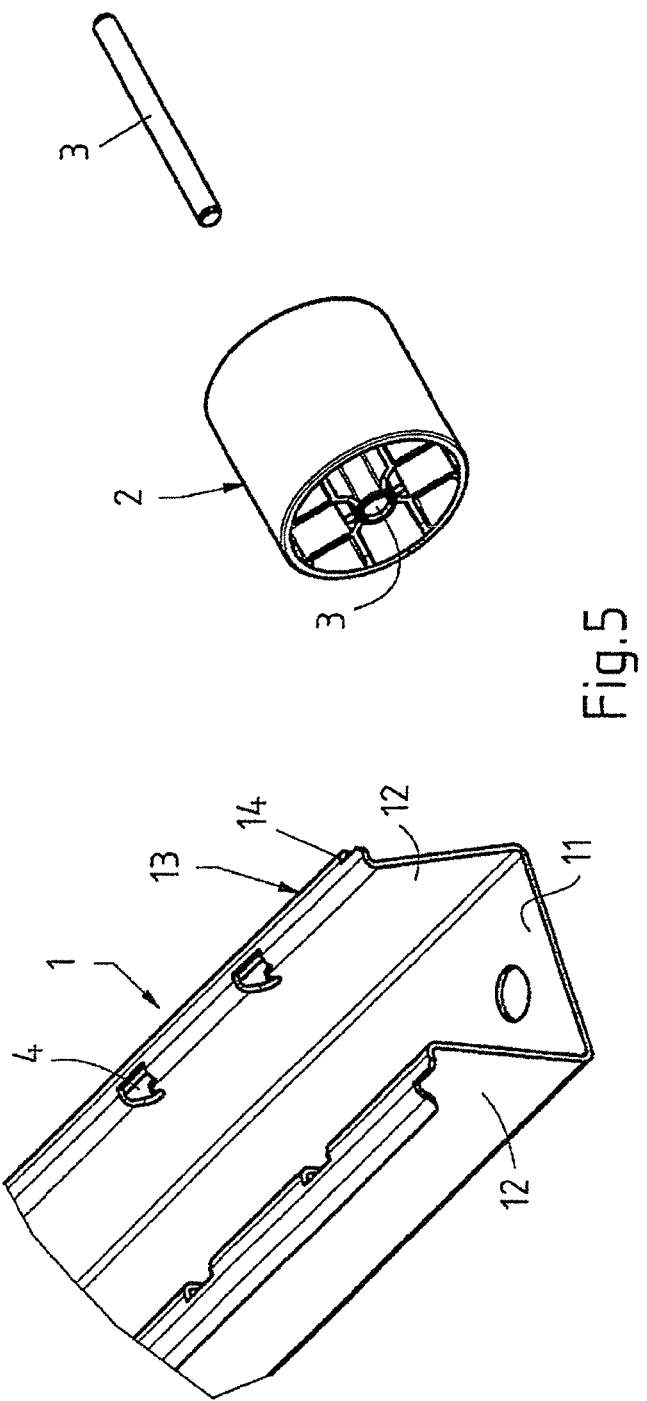

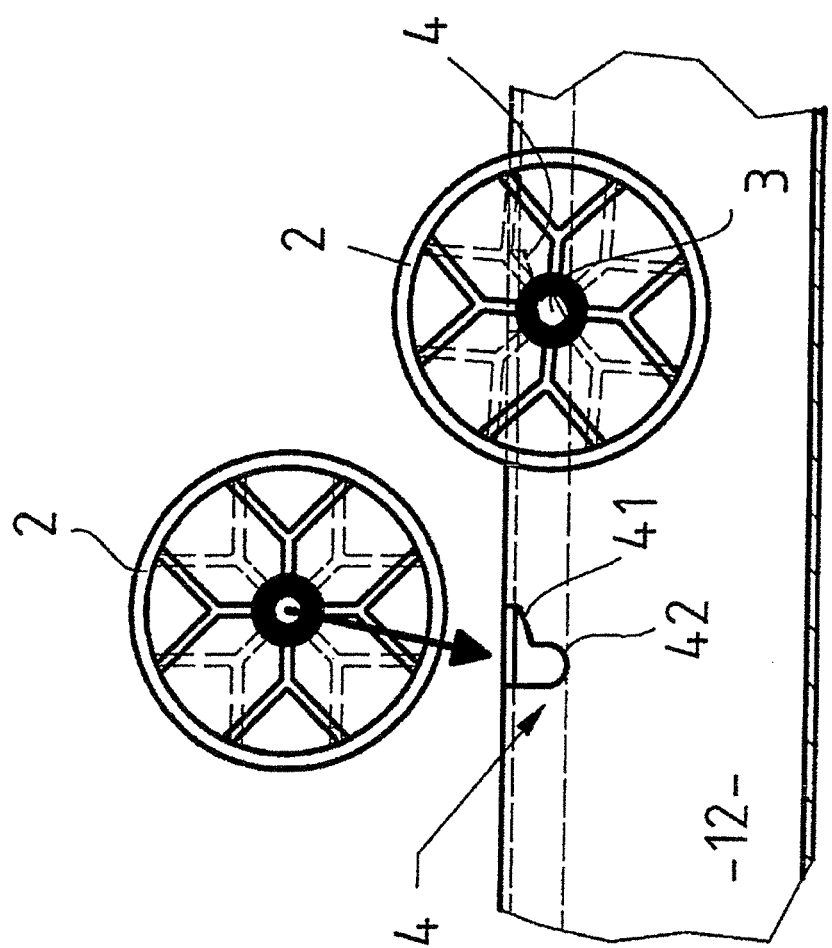

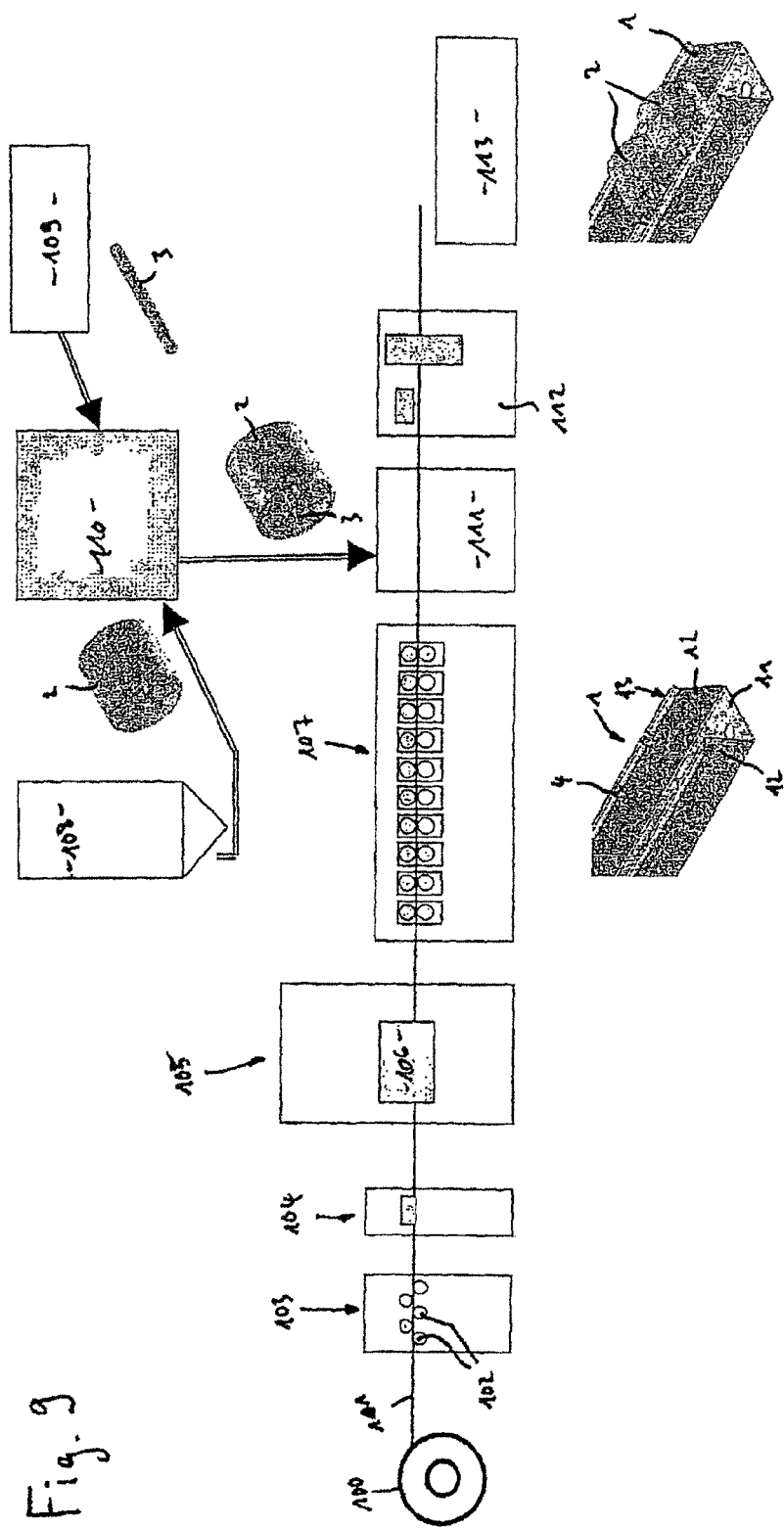

ROLLER TRACK HAVING A PROFILE RAIL

BACKGROUND OF THE INVENTION

1. Field of the Invention

The invention relates to a roller track for transporting stored goods, with a profile rail having a base and two side walls extending at an angle relative to the base, the side walls of which are formed such that they are prone to pivot onto each other under the influence of a force directed toward the base, multiple roller bodies that are rotatably supported about rotating axles in bearing openings of the side walls, and means for securing the positions of the rotating axles in the bearing openings. A further subject matter of the invention is a method for producing such a roller track.

2. Description of the Related Art

The use of roller tracks as transport and/or storage means is common in storage and order-picking technology both in the form of individual roller tracks and as part of larger live storage racks. Known roller tracks usually consist of a channel-shaped, sheet metal-bent profile rail at the side walls of which multiple roller bodies are supported in a freely rotatable manner and arranged one after the other in the longitudinal direction of the profile rail. The stored goods to be transported can be placed onto the roller bodies from the feed side and, due to the inclination of the roller track, be transported along the profile rails under the influence of gravity in the direction toward the discharge or picking side. The roller tracks can be used in a pairwise arrangement, so that one side of the stored good to be transported lies on a first roller track and the other side of the stored good lies on a second roller track. The stored goods are mostly packaged goods or standardized pallets, containers, stacking boxes, transport boxes, cartons, single packages, etc.

Many roller tracks have a rigid profile rail with a base and two side walls extending at a right angle relative to the base, the side walls being provided with the bearing openings for the rotating axles of the roller bodies. To secure the rotating axles in their positions on the profile rail, additional securing elements, such as nuts, holding clips, bolt, etc., are often used, resulting in a construction that requires many component parts and involves great assembling effort in particular for a large number of roller bodies.

Furthermore, constructions are known in which the side walls of the profile rails are inclined obliquely toward the center of the profile rail at least in some parts. Such a construction is known from the Korean utility model 2002 15858. Through bores extending transversely to the side walls serve as bearing openings into which the rotating axles are inserted from the side in a direction transversely to the side walls. To axially secure the rotating axles, the upper free ends of the side walls are shaped such that an abutment surface lying axially behind the free end of the rotating axle is formed by a kind of multiple folding, said abutment surface preventing the rotating axle from slipping out of the bearing openings.

Such roller tracks can do without additional securing elements for securing the positions of the rotating axles in the holding openings, however, they have the disadvantage that the insertion of the rotating axles into the bearing bores is comparatively complex due to the bearing openings being formed as bores and extending transversely to the side walls. First of all, the side walls need to be straddled, so that the distance between the side walls is sufficient to insert the rotating axle into the space between the side walls. Only after the distance of the side walls and thus of the bearing openings is larger than the length of the rotating axle can be roller body, together with the rotating axle, be brought to a position between the two bearing bores toward the base of the profile rail from above. In this position, the rotating axle is to be held in a manner aligned with the bearing openings that extend transversely to the side walls, whereupon straddling of the side walls can be reversed and the ends of the rotating axle enter the bearing opening.

Based on such a prior art, it is an object of the invention to provide a roller track and a method of producing a roller track, which distinguish themselves by a simple assembly of the roller bodies.

SUMMARY OF THE INVENTION

A first aspect of the invention relates to a roller track for transporting stored goods, with a profile rail having a base and two side walls extending at an angle relative to the base, the side walls being formed such that they are prone to pivot onto each other under the influence of a force directed toward the base, multiple roller bodies that are rotatably supported about rotating axles in bearing openings of the side walls, and means for securing the positions of the rotating axles in the bearing openings, the holding openings being formed as depressions extending from the free edge of the side walls toward the base.

The depressions extending from the free edge of the side walls toward the base allow a simple assembly of the roller bodies, which are provided with the rotating axles, in the bearing openings of the side walls. The term depression is not to be construed as describing a specific production method for producing bearing openings. Instead, the depressions can be produced in an arbitrary manner, e.g. by punching the depressions prior to a profiling step of the profile. Bearing openings thus configured may have an opening toward the free end of the respective side wall, therefore be open toward the top. The roller bodies can be inserted into the bearing openings by being lowered from above, together with their rotating axles. It is not required to position the rotating axles of the roller bodies exactly above the bearing openings during the assembly, i.e. to align them with respect to the bearing openings in the radial direction of the axles, resulting in an overall assembly-friendly roller track, the roller bodies of which can be mounted quickly on the profile rail.

One embodiment of the roller track provides that the distance of the free ends of the side walls is smaller than the width of the base. In the area of the side walls where the distance is measured, supporting surfaces can be formed at the bottom of the bearing openings, by which the rotating axles of the roller bodies are supported, so that the distance of the supporting surfaces is smaller than the width of the base. The small distance may lead to a transverse force acting on the free ends of the side walls, said force promoting inward pivoting of the side walls.

A further embodiment provides that the side walls enclose an angle of less than 90° with the base at least in some parts, whereby a reduction of the distance of the side walls with respect to the base can be achieved.

In this connection, it is further proposed that the side walls enclose an angle of less than 90°, preferably in the range of 85°, with the base over their entire height. The side walls of this embodiment form long spring legs with a correspondingly favorable spring behavior.

According to a further embodiment, it is proposed to provide securing means on the profile rail, which are preferably formed as single-piece folds of the side walls, wherein the securing means have a portion that opposes the free ends of the rotating axles. This portion prevents the rotating axles from axially slipping out of the bearing openings of the side walls without having to assemble additional add-on parts.

It is further proposed to form the profile rail such that the portions abut on the free ends of the rotating axles upon a pivoting movement of the side walls, whereby the positions of the rotating axles are secured upon the spring-back of the side walls under load. Here, the roller track may be configured such that in the assembled state of the roller track there is a play between the portions and the free ends of the rotating axles, which may decrease under load until the portions come to abut on the free ends of the rotating axles. For another configuration, the portions may abut on the free ends of the rotating axles in an elastically biased manner in the assembled state, the biasing force increasing under load.

A further embodiment provides that in the abutment position of the portions the distance between the side walls is larger than the width of the roller bodies. Thereby, it can be avoided that the side walls clamp the roller bodies in between when pivoting inwardly and in this way decelerate or block the rotating movements thereof.

It is further proposed that the width of the bearing opening in the area of the free end of the side wall be larger than the diameter of the rotating axle. Such a width or extension of the bearing opening toward the profile track results in a further simplification of the assembly, since the positioning of the rotating axle above the bearing opening in the longitudinal direction of the profile track may take place within a larger area. The width of the bearing opening in the area of the free end may be larger than the 1.2-fold amount of the corresponding axle diameter.

A further embodiment provides that the bearing opening becomes narrower toward the base. Here, the bearing opening may be formed narrower toward the base than in the area of the free end of the side wall. The bearing opening may have a width in the area of the base that substantially corresponds to the diameter of the rotating axle.

A self-centering effect can be achieved by this embodiment, according to which the rotating axle placed above the bearing opening, which is wider at the top, is self centering within the bearing opening, which converges in a funnel-shaped manner toward the base. This simplifies the assembly as well.

It is further proposed that the bearing opening have an insertion slant and/or a bearing shell substantially corresponding to the diameter of the rotating axle. The rotating axle may be placed over the bearing shell directly or the insertion slant. Due to the downwardly sloping, ramp-shaped insertion slant, the rotating axle slips into the bearing shell without an exact alignment with respect to the bearing shell being required for this. The bearing shell may be formed such that the rotating axle is fixed against a reciprocating movement in the longitudinal direction of the profile rail. The bearing shell may be configured as a base area of a punched section by which the bearing opening is formed.

According to a further embodiment, two opposite bearing openings have an opening width smaller than the length of the rotating axle. The opening width can be measured in the longitudinal direction of the rotating axle in the relaxed state of the profile track with rollers inserted or not and/or in the assembled state with rollers fitted. In this embodiment, it is not possible to insert the rotating axle into the bearing openings without straddling the side walls in advance. Only after the side walls have been straddled such that the opening width corresponds to the length of the rotating axle can the rotating axle be placed in the bearing openings from above, whereafter straddling of the side walls can be reversed. In this way, the position of the rotating axle can not only be secured in the axial direction, but also in a radially outward direction. The opening width may be dimensioned such that the profile track only has to be widened a little in order to be able to insert the rotating axles.

According to a further embodiment, it is finally proposed that the front side of the roller bodies be formed to be frusto-conical. As a result of the frusto-conical shape, only a small proportion of the roller body front sides can come into abutment with the side walls, resulting in little friction between the roller bodies and the side walls.

Further modifications of the roller track can be taken from the following explanations given with respect to the method.

A second aspect of the invention relates to a production method of a roller track for transporting stored goods, with the steps of providing multiple roller bodies with rotating axles, providing a profile rail having a base and two side walls extending at an angle relative to the base, the side walls being formed such that they are prone to pivot onto each other under the influence of a force directed toward the base, the side walls having bearing openings and means for securing the positions of the rotating axles in the bearing openings, and inserting the rotating axles into the bearing openings of the side walls, wherein the roller bodies, together with the rotating axles, are inserted into the bearing openings in an insertion direction downward toward the base of the profile rail from above the bearing openings.

Insertion of the roller bodies together with the rotating axles toward the side walls simplifies the arrangement of the roller bodies on the profile track. It is not required to hold the free ends of the rotating axles in an axial alignment with respect to bearing openings extending transversely to the side walls. It is sufficient for the assembly to align the roller bodies with the corresponding rotating axles above the bearing openings and to lower them to the assembly position from there.

An embodiment of the method provides that the opening width of the mutually opposite bearing openings is temporarily enlarged by straddling the side walls prior to the step of inserting the rotating axles, and that the opening width of the mutually opposite bearing openings is reduced again after the step of inserting the rotating axles into the bearing openings. In this way, the position of the rotating axle can also be secured in a radially outward direction. Straddling may be conducted by means of a straddling device, which acts the legs in the interior of the profile track and pushes them apart. It is further conceivable that the straddling device acts on the portions on the outside and pulls the legs apart by straddling forces acting on the portions. By the latter configuration, the interior of the profile rail can be kept free, so that sufficient space for the insertion of the rollers is provided.

In such a method, straddling of the side walls can be performed in a locally limited area in the longitudinal direction of the profile rail, wherein the rollers can be inserted in this area afterwards. Thus, already inserted rollers can be fixed in their inserted positions in an area lying behind this locally limited area in the production direction by a spring-back of the legs of the profile rail.

Moreover, in such a method, the method may further comprise a bearing opening making step in which the bearing openings are produced in a non-profiled or already profiled sheet metal. The bearing opening making step may comprise a punching step, for example. Other methods for producing the bearing opening are conceivable as well.

Further, a profiling step may be provided in such a method, which may precede the insertion of the rollers. Here, a sheet metal can be given its cross-sectional shape described with respect to the first or second aspects of the invention.

In such a method, a timing of the making of the individual bearing openings and a timing of the insertion of the individual rollers into the bearing openings can take place, wherein the timing of the making of the individual bearing openings and the timing of the insertion of the individual rollers can take place in dependence on one another. The timing of the insertion of the individual rollers can be controlled in dependence on the timing of the making of the individual bearing openings. The timing of the making of the individual bearing openings can be detected by sensors, for example, and the timing of the insertion of the individual rollers can be caused in dependence on the detected value. A production speed can be achieved by such a control.

Such methods may be configured as continuous methods. Along a production line, first of all punching steps may be performed by means of which bearing openings are punched out of sheet metal, which is fed from a sheet metal coil, for example, subsequently, the sheet metal can be brought into the desired profile shape in the profiling step, whereafter the profile can be straddled, whereafter the rollers can be inserted. A profiling step may be a cold forming process, e.g. by cold rolling.

Further modifications of the production method can be taken from the above explanations with respect to the roller track.

A third aspect of the invention relates to a method for producing a roller track for transporting stored goods, with the steps of determining different roller body distances for the roller track to be produced, producing a profile rail (1) with bearing openings (4), which have different distances (a, b, c) from each other in the longitudinal direction of the profile rail (1), said distances corresponding to the specific roller body distances, providing multiple roller bodies (2) with rotating axles (3), inserting the rotating axles (3) into the bearing openings (4). The step of determining different roller body distances can be performed in use according to predetermined working conditions of the roller track to be produced, for example. Thus, the step of determining may be part of a planning process of an entire conveyor line. Therefore, the production of individual roller tracks for a conveyor line can be individual, so that roller tracks can be provided with individual, different roller distances. Here, it is possible to first of all determine every single distance of a roller individually and to then produce the roller track correspondingly.

Such a method may further comprise method steps as described with respect to the second aspect. For example, the production of different roller tracks can take place successively in a continuous method. Moreover, such a method may comprise method steps as can be taken from the following description of a production line corresponding to a fourth aspect.

A fourth aspect relates to a production line for producing a roller track, described with respect to the first aspect, by applying a method described with respect to the second aspect and/or the third aspect.

Such a production line may comprise a punching device for punching out the bearing openings, and a profiling machine for forming a metal strip material.

Furthermore, such a production line may comprise a straightening unit for straightening a metal strip material and/or a feeding device for inserting the rollers into the bearing openings and/or a cutting device for cutting the fitted roller tracks to length.

One embodiment of such a production line can be a production line, for example, in which sheet metal is continuously wound off from a sheet metal coil, which is straightened in the straightening unit at the next stage, subsequently enters a punching device, in which bearing openings are punched at a distance from the adjacent bearing opening, which distance may vary from bearing opening to bearing opening according to the determined specifications, which subsequently enters the profiling machine in which the sheet metal is formed such that it obtains a corresponding substantially U-shaped profile, wherein a feeding device is arranged downstream of the profiling machine in the production line, said feeding device being entered by the finish-profiled profile, into which rollers with rotating axles are inserted into the bearing openings from above, and wherein a cutting device is provided downstream, in which the finish-fitted profiles are cut to length.

Preferred embodiments of the invention will be described in the following by way of example. The described embodiments partly have features that are not absolutely imperative for embodying the present invention, but that are generally considered to be preferable. Thus, embodiments that do not have all features of the embodiments described in the following are also considered to fall within the scope of the teaching of the invention. It is also conceivable to combine individual features that are described with respect to different embodiments.

BRIEF DESCRIPTION OF THE DRAWINGS

FIG. 5 some parts of the roller track in perspective view.
FIG. 8 a side view of a sub-area of the roller track, to illustrate the assembly of a roller body on the profile rail.
FIG. 9 an overview, in the form of a circuit diagram, of the production method for producing a roller track according to the invention.

DETAILED DESCRIPTION OF THE PREFERRED EMBODIMENT

Figure 1:
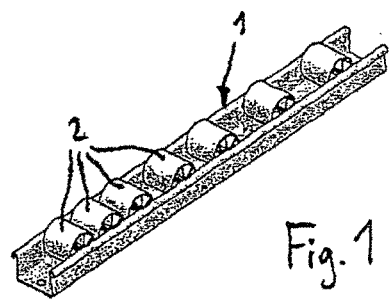
FIG. 1 a perspective partial view of a roller track.

FIG. 1 is a perspective view of a roller track composed of a channel-shaped profile rail 1 and multiple roller bodies 2 arranged one after the other in the direction of the profile rail 1, which are rotatably supported by rotating axles that cannot be seen in FIG. 1.

Figure 2:
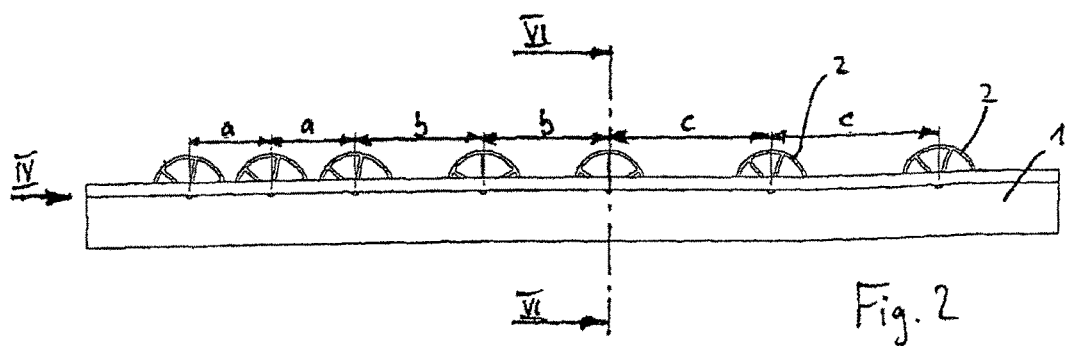
FIG. 2 a side view of the roller track of FIG. 1.

When viewed over the length of the profile rail 1, the roller bodies 2 have different distances, cf. FIG. 2. In the area of the feed side, i.e. the side where the stored goods are received, the roller bodies 2 are concentrated, i.e. the distances a are closer than the distances b, which in turn are closer than the following distances c. The number of rollers can also be increased in the picking area and in other sections of the roller track where the stored goods reside for a longer time.

Figure 3:
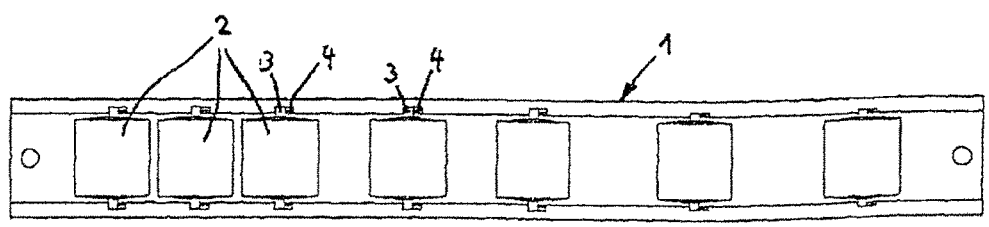
FIG. 3 a plan view of the roller track of FIG. 1.
Figure 4:
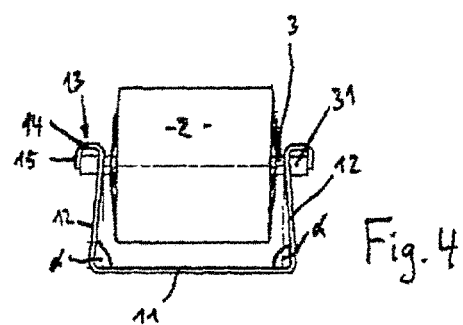
FIG. 4 a view of the roller track in the direction designated with IV in FIG. 2.

As is illustrated in FIGS. 3 and 4, the profile rail 1 has a plane base 11 and two side walls 12 extending upward at an angle relative thereto. The profile rail 1 is a sheet metal molded part, which is produced e.g. by multiple bending, folding, deep drawing, or combinations of these an other known methods of sheet metal forming.

The side walls 12 of the profile 1 have bearing openings 4 at the upper ends thereof, in which the rotating axles 3 of the roller bodies 2 are arranged transversely to the rail 1. The bearing openings 4 may be configured as described with reference to FIG. 8. The side walls 12 may be configured such as to not extend at a right angle relative to the base 11, but are slightly inclined inwardly.

Figure 7B:
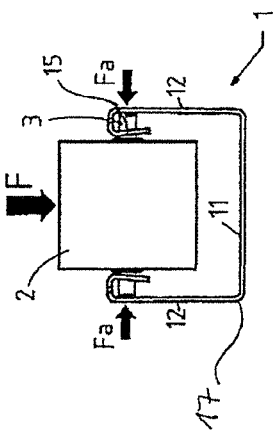
FIG. 7b a sectional view of a roller track with a further alternative profile cross section in a loaded state.
Figure 7A:
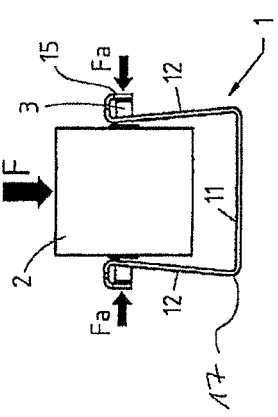
FIG. 7a a sectional view, corresponding to FIG. 6, of the roller track in a loaded state.

In the embodiment shown in FIG. 7a, the inclination angle α is approximately 85°. In other modifications of this embodiment, the inclination angle α may be between 80° and 90° or between 60° and 97°. In this embodiment, the side walls are substantially plane and are folded directly near the base. In the modification of the embodiment shown in FIG. 6, the side walls 12 have a kink in the longitudinal direction between the base 11 and the upper area and are not substantially plane due to the kink. Starting from the base 11, the side walls 12 first of all extend upwardly substantially at a right angle, and are only folded inwardly at a distance above the base. In both embodiments, the distance A between the free ends of the side walls 12 is smaller than the width B of the base 11, cf. FIG. 6. The result is that a certain transverse force component $F_Q$ is created when a heavy stored good is supported or a force F acts toward the base 11, said transverse force component causing the free ends of the side walls 12 to pivot onto each other in the direction of the arrows Fa, as is shown in FIG. 7a. The channel-shaped profile rail 1 tends to close the profile opening under load.

Figure 6:
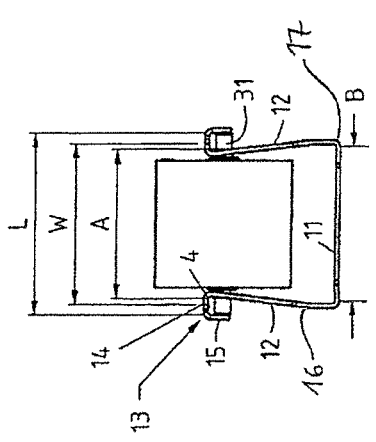
FIG. 6 a sectional view according to the line of cut designated with VI-VI in FIG. 2, with the roller track illustrated in a load-free state.

In the embodiments shown in FIGS. 6 and 7a, supporting surfaces of the bearing openings 4, on which the rotating axles 3 are supported, are arranged in the area of the free ends of the side walls 12.

Starting from the free ends of the side walls, portions 14 of the side walls above the rotating axles 3 each extend in a direction outward from the center of the profile rail. These portions 14 can extend as substantially horizontal portions 14, for example. A part of the bearing opening 4 may be provided in the area of the portion 14, wherein the distance between the edges of the two corresponding bearing openings 4 in the area of the opposite portions 14 may be smaller at the opposite side walls 12 than the length L of the rotating axle, when the rotating axles 3 are inserted into the bearing openings 4. Thus, the side walls of the profile rail can be widened upon insertion of the rollers 2 with the rotating axles 3, so that the rotating axles 3 can be inserted. After the insertion of the rotating axles 3, the side walls can be brought to a position, e.g. in an elastically recovering manner, in which the distance between the edges of the two corresponding bearing openings 4 in the area of the opposite portions 14 is smaller than the length L of the rotating axle. Thereby, the rotating axle can be held and secured in the bearing openings 4 in the transverse direction with respect to the rotating axle 3 by the horizontal portions 14.

The horizontal portions 14 are adjoined by further portions 15, which extend transversely to the rotating axle. These portions may be formed as vertical portions that extend downwardly substantially perpendicularly. Such portions 15 can abut on the ends of the rotating axles 3 with a small gap width when the rotating axles 3 are inserted into the profile. It is also conceivable that the portions 15 abut on the ends of the rotating axles 3 in an elastically biased manner.

The respective rotating axles 3 can be withheld from slipping out or falling out of the support positions in the axial direction of the rotating axles 3 by the vertical portions 15.

FIG. 7b illustrates a further embodiment of a profile in which the side walls 12 extend upwardly at a right angle relative to the base. Above the axles 3, portions of the side walls each extend toward the center of the profile rail. A further portion 15 adjoins in a downwardly extending manner. The bearing openings 4 are arranged on these latter portions. The bearing openings may be configured as shown in FIG. 8, according to which the upper area of the bearing opening 4 has an insertion slant 41 and is inclined toward a lower-lying bearing shell 42. The rotating axle 3 comes to rest in a bearing shell 42 on both sides of the profile rail 1. Since the bearing shells are arranged in a manner displaced toward the center of the profile rail with respect to the kink site 17, which is formed between each of the side walls 12 and the base, a tilting moment is applied to the side walls 12 when the roller is loaded by a force F, with the result that the side walls 12 tend to pivot onto each other under load.

FIG. 5 is a perspective view that, on the left, shows the construction of the bearing opening 4 provided in the side wall 12. The openings 4 extends into the material of the side wall 12 from above. The bearing opening 4 is formed like a depression in its entirety, which extends in the plane of the side wall from the free edge of the side wall 12 toward the base 11. Thus, the roller 2 provided with the rotating axle 3 can be lowered from above, i.e. substantially toward the side walls 12, into the opening 4 and be accommodated there.

The bearing opening 4 has a geometry that allows a simple insertion of the roller body 2 and the rotating axle 3 from above. In the area of the free edge of the side wall 12, the width of the bearing opening 4, i.e. its extension toward the profile rail 1, is larger than in shell-shaped lower-lying area. The upper area of the bearing opening 4 has an insertion slant 41 inclined toward a lower-lying bearing shell 42. The diameter of the bearing shell 42 substantially corresponds to the diameter of the rotating axle 3, with a certain oversize, to achieve a tilt-free slip-in of the rotating axle 3. The insertion slant has an overall ramp-like inclined geometry and forms a kind of insertion funnel for the rotating axle 3. The roller 2 illustrated on the right of FIG. 8 is shown in the final position in which the rotating axle 3 has taken its position in the bearing shell 42 of the opening 4.

In this final position, the position of the rotating axle 3 is secured by a securing means 13. Details on the position securing can be taken from FIGS. 6 and 7, which show the profile of the profile rail 1 both in the load and unloaded states.

A double fold, which is composed of two portions 14, 15, in the area of the upper end of the side wall 12 serves as the securing means 13. The one portion 14 substantially extends toward the rotating axle 3, whereas the other portion 15 is transverse to the axle direction of the rotating axle 3 and faces the free end of the rotating axle 3 on the front side. As can be taken from the illustration in FIG. 6, a certain gap between the inner surface of the portion 15 and the front face of the rotating axle 3 is present in the unloaded state of the roller track, which is why the axle 3 can be moved back and forth in the axial direction within the bearing opening 4 with a certain play. This play is not present any more when a sufficiently heavy stored good is supported, as this is shown in FIG. 7a. By the application of a force F directed toward the base 11, a transverse force $F_Q$ directed toward the axle body 3 occurs at the portions 15 connected unitarily with the side walls 12, with the result that the free ends of the side walls 12 pivot onto each other until the portions 15 abut on the front-side ends of the rotating axle 3. Here, the pivot path or the profile rail 1 is dimensioned such that in the abutment position of the portions 15 on the ends of the rotating axle 3 a sufficient minimum distance between the two side walls 12 remains, which still allows the rotation of the roller body 2. The roller body 2 is narrower than this minimum distance, so that a deceleration or jamming of the roller body 2 can be avoided.

As can be further taken from the illustrations in FIGS. 6 and 7, the pair of the mutually opposite openings 4 has an opening width W smaller than the length L of the rotating axle 3. For this construction, it is required that the upper ends of the side walls 12 are first of all widened by being straddled, i.e. have to be bent away from each other, until the opening width W corresponds to the axle length L, so that the rotating axle 3 is insertable into the bearing openings 4 from above. The side walls 12 can then return to their original position, whereby in addition to the axial securing by the portions 15, the position can also be secured in an radially upward direction of the rotating axle 3 by the portions 14. The profile rail according to the embodiment of FIGS. 6 and 7 is dimensioned such that the opening width W then corresponds to the axle length L of the rotating axle 3 if the side walls 12 enclose an angle of 90° with the base 11.

According to the illustration of FIG. 5, the bearing opening 4 extends only partly into the portion 14 of the securing fold 13, which is approximately parallel to the base 11. After the spring-back of the side walls 12, radial securing is achieved by the area of the portion 14 into which the opening 4 does not extend.

Finally, FIG. 9 illustrates an embodiment of a production line suitable to perform a possible production method for producing a roller track according to the invention. The lower part shows the production of the profile rail 1, and the upper part the production of the roller body 2 as well as its fitting with the rotating axle 3, whereafter the rollers 2 are arranged on the profile rail 1.

The production of the profile rail takes place starting from a metal strip material 101 wound up on a coil, which is wound off and subsequently guided through a straightening unit 103, which has multiple rollers 102 and straightens the strip material, and a device 104 to a punching device 105, the pressing tool 106 of which punches the bearing openings 4 out of the strip-like material 101. The bearing openings can be applied in an automated manner at different distances from each other according to the requirements on the finished roller track, which correspond to the purpose and location of use of the finished roller track. Subsequently, the channel-shaped cross section of the profile rail 1 is produced in a profiling machine 107 with the securing means 13 that are provided on the free ends of the side walls 12.

Parallel with the production of the profile rail 1, the rollers 2 are produced from a plastic material, for example by injection molding or extrusion molding, in a corresponding device 108. The bolt-shaped rotating axles 3 are produced in a further machine 109 and subsequently inserted into the roller bodies 2 in a fitting machine 110. After that, the roller bodies 2 are inserted, together with the rotating axles 3, into the bearing openings 4 of the profile 1 in a fitting device 111, as has been described in detail above. Afterwards, the profile rails are marked and subsequently cut to length in a further cutting device 112, whereafter they are transported away by means of suitable transport devices 113 according to a last method step.

The invention claimed is:

1. A roller track for transporting stored goods, comprising:
   a profile rail (1) having a base (11) and two side walls (12) extending at an angle relative to the base (11), the side walls (12) being formed such that they are prone to pivot onto each other under the influence of a force directed toward the base (11),
   multiple roller bodies (2) that are rotatably supported about rotating axles (3) in bearing openings (4) of the side walls (12),
   and means (13) for securing positions of the rotating axles (3) in the bearing openings (14), wherein
   the bearing openings (4) are formed as depressions extending from free ends of the side walls (12) toward the base (12),
   a distance (A) between the free ends of the side walls (12) is smaller than a width (B) of the base (11),
   the side walls (12) enclose an angle (a) of less than 90° with the base (11) at least in some parts, and
   securing means (13) are provided and are defined as single-piece double folds of each of the side walls (12), a portion (14) of each of the securing means (13) extends out in a direction of the rotating axles (3), and a further portion (15) of each of the securing means (13) is transverse to an axle direction of the rotating axle (3) and opposes free ends (31) of the rotating axles (3).

2. The roller track according to claim 1, in which the side walls (12) enclose an angle (a) of less than 85° with the base (11) over an entire height of the side walls (12).

3. The roller track according to claim 1, in which the profile rail (1) is formed such that the portions (15) of each of the securing means (13) that is transverse to an axle direction of the rotating axle (3) and opposes the free ends (31) of the rotating axles (3) abut against the free ends (31) of the rotating axles (3) upon a pivoting movement of the side walls (12).

4. The roller track according to claim 1, wherein a width of the bearing opening (4) in an area of the free end of the side wall (12) is larger than a diameter of the rotating axle (3), and wherein the bearing opening (4) is narrower toward the base (11) than in the area of the free end of the side wall (12).

5. The roller track according to claim 4, wherein bearing opening (4) has an insertion slant (41) and a bearing shell (42) substantially corresponding to the diameter of the rotating axle (3).

6. The roller track according to claim 1, wherein two opposite bearing openings (4) are spaced apart from one another by an opening width (W) that is smaller than a length (L) of the rotating axle (3).

7. A method for producing a roller track for transporting stored goods, comprising the steps of:
   providing multiple roller bodies (2) with rotating axles (3),
   providing a profile rail (1) having a base (11) and two side walls (12) extending at an angle relative to the base (11), the side walls (12) being formed such that they are prone to pivot onto each other under the influence of a force directed toward the base (11), the side walls (12) having bearing openings (4) and means (13) for securing positions of the rotating axles (3) in the bearing openings (4), a distance (A) between free ends of the side walls (12) is smaller than a width (B) of the base, and the sidewalls (12) enclosing an angle (a) of less than 90° with the base (11) at least in some parts, providing securing means (13) formed as single-piece, double folds of the side walls (12), a portion (14) of the securing means (13) extending outward in a direction of the rotating axles (3), and a further portion (15) of the securing means (13) is transverse to an axle direction of the rotating axle (3) and opposes the free ends (31) of the rotating axles (3), and inserting the rotating axles (3) into the bearing openings (4) of the side walls (12), wherein the roller bodies (2), together with the rotating axles (3), are inserted into the bearing openings (4) in an insertion direction downward toward the base of the profile rail from above the bearing openings (4).

8. The method according to claim 7, further comprising temporarily enlarging an opening width (W) of the mutually opposite bearing openings (4) by straddling the side walls (12) prior to the step of inserting the rotating axles, and then reducing the opening width (W) of the mutually opposite bearing openings (4) after the step of inserting the rotating axles into the bearing openings.

9. The method according to claim 8, wherein the step of straddling of the side walls (12) is performed in a locally limited area in longitudinal direction of the profile rail, in which the rollers are inserted.

10. The method according to claim 8, wherein the method further comprises a bearing opening making step in which the bearing openings (4) are produced in a non-profiled or already profiled sheet metal.

11. The method according to claim 10, wherein the method further comprises a profiling step that precedes the insertion of the rollers.

12. The method according to claim 11, wherein a timing of the making of the individual bearing openings takes place, in which a timing of the insertion of the individual rollers into the bearing openings takes place, and in which the timing of the making of the individual bearing openings and the timing of the insertion of the individual rollers take place in dependence on one another.

13. The method according to claim 7, further comprising:
determining different roller body distances for the roller track to be produced, and the step of providing a profile rail (1) with the side walls (12) having the bearing openings (4) comprises producing the profile rail (1) to have the bearing openings (4) at different distances (a, b, c) from each other in a longitudinal direction of the profile rail (1), said distances corresponding to the specific roller body distances.

\* \* \* \* \*